C. R. HARRIS.
CLASP FOR SUSPENDERS.
No. 11,187. Reissued Sept. 1, 1891.
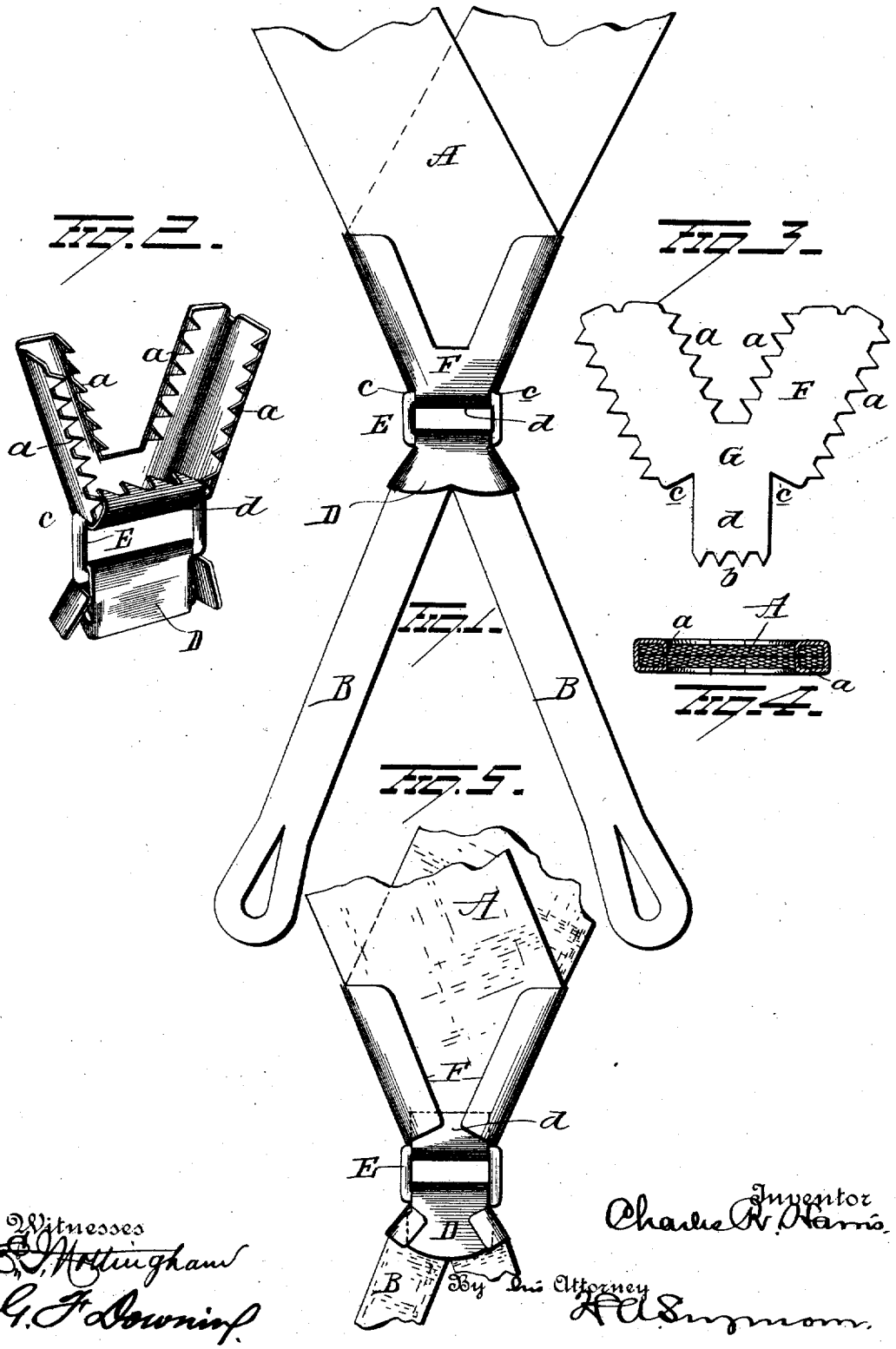
Witnesses
E. Nottingham
G. F. Downing
Inventor
Charles R. Harris
By his Attorney
H. A. Simmons
THE NORRIS PETERS CO., PHOTO-LITHO., WASHINGTON, D. C.

UNITED STATES PATENT OFFICE.

CHARLES R. HARRIS, OF WILLIAMSPORT, PENNSYLVANIA.

CLASP FOR SUSPENDERS.

SPECIFICATION forming part of Reissued Letters Patent No. 11,187, dated September 1, 1891.

Original No. 431,694, dated July 8, 1890. Application for reissue filed September 29, 1890. Serial No. 366,567.

*To all whom it may concern:*

Be it known that I, CHARLES R. HARRIS, of Williamsport, in the county of Lycoming and State of Pennsylvania, have invented certain new and useful Improvements in Clasps for Suspenders and Like Articles; and I do hereby declare the following to be a full, clear, and exact description of the invention, such as will enable others skilled in the art to which it appertains to make and use the same.

My invention relates to an improvement in clasps for suspenders and like articles.

Heretofore the metal loop carried by the button-hole strap has been secured within a leather or fabric loop attached by threads to the main suspender-straps. Such a construction is defective in that the contact of the leather or fabric with the metal loop soon causes the former to split or tear at the point of contact, thus rendering the suspenders worthless.

The object of my invention is to provide an ornamental metal clasp for securing together the rear ends of the main suspender-straps, and also form a solid and substantial bearing for the loop carried by the button-hole strap.

With these ends in view my invention consists in the parts and combinations of parts, as will be more fully described, and pointed out in the claims.

In the accompanying drawings, Figure 1 is a view of the rear ends of the main suspender-straps, showing my invention applied thereto. Fig. 2 is a perspective view of the clasp partly opened. Fig. 3 is a view in elevation of the blank. Fig. 4 is a view in elevation through the strap and clasp, and Fig. 5 is a view of the inner face of the clasp attached to suspenders.

A represents the main suspender-straps, and B the button-hole straps, the latter being provided at their upper ends with a clasp D, carrying the loop E. This loop can be oblong and angular in shape, as shown, or it may be circular or any other convenient shape, and is loosely mounted in the lower end of the metallic clasp F, which latter forms the subject-matter of the present invention. This clasp F when applied to the straps is V-shaped, with straight sides and lower end; but it is evident that the lower end could be rounded or curved to suit the taste of the user or the convenience of the manufacturer. The blank G, from which the clasp is formed, is struck up from suitable sheet metal, and is provided on its side edges with teeth *a* and on its extreme lower edge or tongue *d* with teeth *b*. The blank is also V-shaped, and is provided on opposite sides near its lower end with notches or cut-away sections *c*, which latter permit the end and sides to be bent over toward the body of the clasp or onto the main strap A, and also afford openings for the loop E. The blank D when constructed with an open front, as shown in the drawings, is bent at or near its center over onto itself, and the teeth *a* and *b* are bent inwardly at right angles to the body of the clasp, so as to enter and engage the straps A. The clasp, instead of being constructed with an open front, as shown in Figs. 1 to 4, inclusive, may have a closed front, or it may have a skeleton or open-work front. With either of these latter constructions the blank instead of being bent centrally, as before referred to, would of course be bent in lines parallel or approximately parallel with its side edges and bottom, sufficient material being turned under to overlap the side edges of the straps A. With the open front clasp the inner and outer edges of both sides thereof are provided with teeth, while with the closed fronts the outer edges only are toothed.

Before the blank G is shaped the loop E is placed on the lower end or tongue *d*, which latter is then turned to the position shown in Fig. 2. The sides of the clasp are then turned up, as shown in said figure, against the side edges of the end section *d*, thereby locking the loop in place. When the blank is thus shaped, the two ends of the strap A are placed in position between the teeth or under the teeth, as the case may be, and the section *d* forced against same, the teeth of said section penetrating both straps. After section *d* has been forced into position, or simultaneously with the forcing of said section against the straps, the side sections are also bent downwardly onto the straps, thus completely and effectually locking the clasp to the straps and securing the ends of the straps against separation or displacement. The end section being below the side sections is prevented from pulling out or releasing the loop, and the clasp when in position not only forms a substantial connection between the main straps and button-hole straps, but also forms a neat and ornamental finish to the ends of the main straps.

It is evident that numerous slight changes in the construction of the clasp might be resorted to without departing from the spirit and scope of my invention. Hence I would have it understood that I do not confine myself to the exact construction shown and described, but consider myself at liberty to make such changes as fairly fall within the spirit and scope of my invention.

Having fully described my invention, what I claim as new, and desire to secure by Letters Patent, is—

1. A clasp made of sheet metal and consisting, essentially, of an approximately V-shaped body having toothed side edges, the latter being turned over on the body, and a depending tongue at its lower end, the said tongue being turned upwardly and overlapped at its upper edge by the bent side edges of the body, substantially as set forth.

2. A clasp made of sheet metal and consisting, essentially, of an approximately V-shaped body having toothed side edges, the latter being turned over on the body, and a depending tongue, the latter being toothed at its free end, the said tongue being turned upwardly and the teeth thereon bent inwardly to engage the fabric to which the clasp is secured, substantially as set forth.

3. In a metal back attachment for suspenders, an approximately V-shaped clasp having teeth adapted to catch and hold the rear ends and outer edges of the two main straps of suspenders, in combination with a clasp for holding a button-hole strap, the said button-hole-strap clasp being loosely carried by the V-shaped clasp, substantially as set forth.

4. A clasp made of sheet metal and consisting, essentially, of an approximately V-shaped body having toothed side edges, the two members or arms constituting said body being folded or turned over onto themselves, a depending tongue at the smaller end of said body, a loop secured in a bearing formed by bending the tongue, and a clasp for a button-hole strap mounted on the loop, substantially as set forth.

In testimony whereof I have signed this specification in the presence of two subscribing witnesses.

CHARLES R. HARRIS.

Witnesses:
GEO. F. DOWNING,
V. E. HODGES.